A. W. FRENCH.
GATE OPERATING MECHANISM FOR MEAL COOKERS AND ANALOGOUS APPARATUS.
APPLICATION FILED APR. 20, 1914.
1,161,041. Patented Nov. 23, 1915.
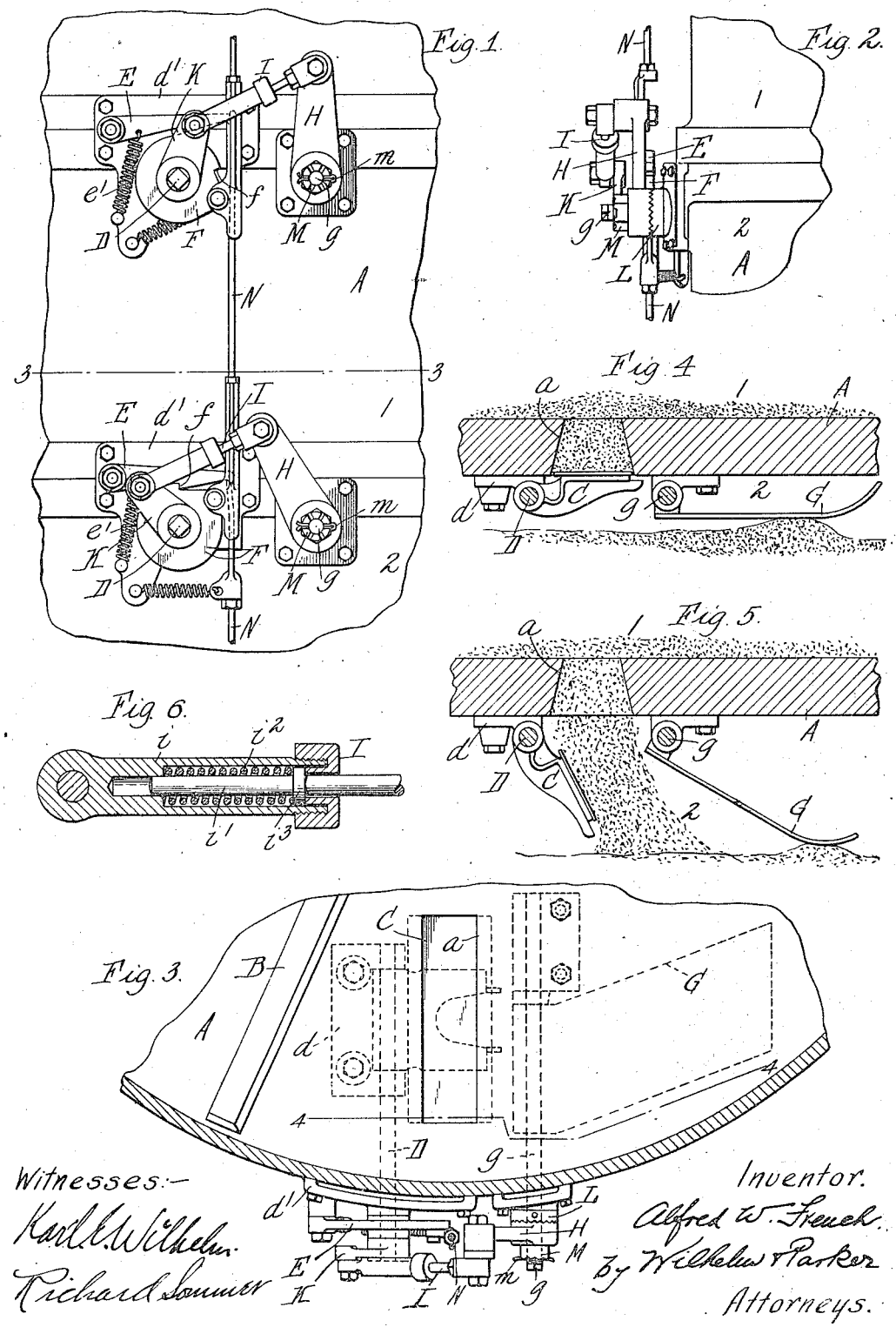

ent text.

UNITED STATES PATENT OFFICE.

ALFRED W. FRENCH, OF PIQUA, OHIO.

GATE-OPERATING MECHANISM FOR MEAL-COOKERS AND ANALOGOUS APPARATUS.

1,161,041.    Specification of Letters Patent.    Patented Nov. 23, 1915.

Application filed April 20, 1914. Serial No. 833,066.

*To all whom it may concern:*

Be it known that I, ALFRED W. FRENCH, a citizen of the United States, residing at Piqua, in the county of Miami and State of Ohio, have invented a new and useful Improvement in Gate-Operating Mechanisms for Meal-Cookers and Analogous Apparatus, of which the following is a specification.

This invention relates to cookers for oil-bearing meal, corn driers, and analogous apparatus having a plurality of chambers which are arranged to permit the material to discharge from one chamber to another and are provided with discharge gates which control the delivery of the material from one chamber to the next in such a way as to regulate the depth of material in the several chambers and the length of time that it remains therein. In Patent No. 1,091,055, granted to me March 24, 1914, is disclosed an apparatus of this nature in which the gates are operated so that one chamber is not discharged until the chamber next below, which receives the material therefrom, has been emptied and the gate thereof closed, the gate of one chamber being closed by a float or device actuated by the material accumulating in the receiving chamber and being held closed by a latch. In the present apparatus, as in said prior apparatus, the discharge gate of one chamber is closed by a float or device actuated by the material accumulating in the next or receiving chamber and is preferably secured when closed by a latch which must be released to permit the gate to open.

One object of this invention is to provide an improved gate closing mechanism of this nature which will operate to positively and quickly close the gate tight or to the latching point in such a way as to prevent the material from packing or accumulating in front of the gate and interfering with the prompt or complete closing of the gate.

Other objects are to provide a construction in which the movement of the gate is greater than that of its actuating float or device so that a relatively small movement of the latter will suffice to completely close the gate from a position in which it is sufficiently open to allow a free or rapid discharge of the material; and also to enable the mechanism to be readily adjusted to regulate, as required, the depth to which the material is permitted to accumulate in the chambers, and so as to prevent injury to the mechanism by the pressure of material on the gate closing device after the gate is closed.

In the accompanying drawings: Figure 1 is a fragmentary elevation of a meal cooker showing gate operating mechanism embodying the invention for two of the gates thereof. Fig. 2 is a fragmentary side elevation thereof. Fig. 3 is a plan thereof partly in horizontal section in line 3—3, Fig. 1. Figs. 4 and 5 are sectional elevations in line 4—4, Fig. 3, respectively showing the gate closed and open. Fig. 6 is a sectional elevation of the link connecting the float and gate.

A represents a portion of an oil-meal cooker or analogous apparatus comprising a series of chambers 1, 2, of which there may be any desired number, each provided with a bottom discharge opening *a* and arranged so that the material can discharge by gravity from one chamber into the next lower chamber.

B indicates an arm or sweep, such as ordinarily employed in meal cookers, which rotates in the lower portion of each chamber for stirring the material. The rotation of this stirrer produces a sort of wave or ridge on the surface of the material which follows the motion of the stirrer, and is made use of, as hereinafter explained, in closing the gate for the discharge opening.

Each chamber except the bottom one is provided with a gate C controlling the discharge opening *a* thereof and adapted to open downwardly into the next chamber below. The material can be discharged from the bottom chamber in any suitable way, depending upon the purpose for which the apparatus is used. In the case of oil-meal cookers the meal is withdrawn from the bottom chamber intermittently in measured quantities for forming cakes for the oil expressing presses. The gate C is secured to a shaft D by which it is hinged and one end of which extends out to the exterior of the apparatus. In the construction shown, the shaft is supported in a bearing *d* on the bottom of the chamber and in a bearing plate *d'* secured exteriorly on the side of the apparatus, and a latch E, pivoted on the bearing plate *d'* and held by a spring *e'* against the edge of a disk F fixed to the outer end of the hinge shaft D, serves to lock the gate when it is closed. The latch permits the gate to close freely, but by engagement with a shoulder *f* on the disk F holds the gate closed. Any other suitable latch device adapted to allow the gate to close and to hold it closed until the latch is released, could be employed.

G represents a gate closing device or float which is adapted to ride or float on the material in the receiving chamber, or chamber below that controlled by the gate C, for closing the gate when the material has accumulated to a predetermined level in the receiving chamber. The float instead of being pivoted to swing about the axis of the gate, as in the construction disclosed in the before mentioned application, is preferably pivoted by a shaft $g$ to swing about a different axis, and, as shown, is located at the forward side of the gate opening $a$ so that the material in discharging through the opening falls in rear of the float G and is caused to move forwardly beneath the same by the rotary stirrer B. There is, therefore, no tendency for the material to fall or accumulate on the float, and the float will always ride freely and unobstructed on the surface of the material. The float shaft $g$, which may be supported in any suitable way, extends to the outside of the apparatus, and is provided at its outer end with a rock arm H connected by a link I to a rock arm K secured to the outer end of the gate shaft D, so that when the float is swung upwardly by the material rising in the receiving chamber it will swing the gate upwardly and close it when the material attains a predetermined depth. The float arm H is preferably longer than the gate arm K, or, in other words, the link is connected to the arms at different distances from the shafts D and $g$ such that the angular movement of the gate will be greater than that of the float. The increased movement of the gate over the float can be made as great as desired, by properly proportioning the lengths of the arms H and K.

The free end of the float rides or floats on the surface of the material and is raised as the level of the material rises in the receiving chamber, and each time the stirrer passes beneath the float the wave of material caused thereby moves the float suddenly upward a distance depending upon the height of the wave. The described connection between the float and the gate therefore enables this relatively small angular movement of the float produced by the wave to swing the gate completely closed from a position in which it permits a comparatively free or rapid discharge of the material through the discharge opening $a$. This final closing movement of the gate produced by the wave is quick and positive, so that the material will not pack or accumulate in the discharge opening or in front of the gate and interfere with the closing thereof, as could happen with a gate which closes slowly and gradually throttles the discharge.

The link I connecting the arms of the gate and the float is preferably composed of telescopic sections $i$ and $i'$, Fig. 6, having an interposed spring $i^2$ by which motion is transmitted from one section to the other. In the link shown, this spring is inclosed in the link section $i$, which is hollow, and bears against a collar $i^3$ in the other link section. The spring is strong enough to cause the movement of the float to close the gate, but it is adapted to yield and prevent injury to the mechanism in the event that the float is lifted farther by the material after the gate is fully closed, or in case the movement of the gate is obstructed.

In order that the gate may be closed to stop the discharge when the material has accumulated to a greater or less depth in the receiving chamber and thus regulate, as required, the quantity of material in the chamber, the float G is adjustably connected with the gate, preferably as follows: The rock arm H is secured to the outer end of the float shaft between a collar L fixed on the shaft and a nut M screwed on the shaft at the outer side of the arm H. The contacting faces of the arm H and the collar L have interlocking serrations by which the arm, which is adapted to turn on the shaft, is rigidly locked thereto when the nut M is tightened. By loosening the nut M the shaft $g$ can be turned in either direction to adjust the float to any desired angular relation to the arm H and gate C, and then secured in this position by again tightening the nut. The float can thus be adjusted so that it will close the gate when the float has been lifted to any desired point by the material. A cotter pin $m$ or any other suitable device can be used for locking the nut M from turning.

The gate closing mechanism is simple and can be readily understood and operated by the ordinary operatives, and the adjustments for different conditions can be readily effected from the outside of the cooker while it is in operation. Any other suitable construction enabling the float to be adjusted to different angular positions could be used.

When the gate has been closed by the float in the manner described it will be retained in the closed position by the latch E until the latch is actuated to release the gate. Preferably the latch for the gate of one chamber is released when the gate for the next lower chamber has been closed, by a rod N pivoted to the latch disk F of the latter gate and adapted to trip the latch for the former gate, in the manner fully described in said prior application. The latch releasing mechanism, however, is not a part of this invention and is not described herein. Any suitable means for locking and releasing the gates could be used, and if found desirable could be dispensed with.

I claim as my invention:

1. The combination with chambers arranged to permit material to discharge from one chamber into another, and a gate which controls the discharge of the material from one chamber into another, of a gate closing device which is actuated by the material accumulating in the receiving chamber for closing said gate, and motion increasing connections between said closing device and said gate whereby a movement of said closing device produces a greater movement of said gate.

2. The combination with chambers arranged to permit material to discharge from one chamber into another, and a gate which controls the discharge of the material from one chamber into another, a movable gate closing device the movement of which is governed by the depth of material in the receiving chamber, and operative connections between said closing device and said gate constructed to produce a movement of said gate greater than the movement of said closing device.

3. The combination with a chamber provided with a discharge opening, a chamber arranged to receive the material discharged through said opening, means which produce a wave in the material in said receiving chamber, and a gate for said discharge opening, of a gate closing device arranged to be actuated by said wave in the material, and operative connections between said device and said gate constructed to produce a movement of said gate greater than the movement of said closing device.

4. The combination with a chamber provided with a discharge opening, a chamber arranged to receive the material discharged through said opening, and a pivoted gate for said discharge opening, of a pivoted gate closing device arranged to be moved by the material accumulating in the receiving chamber, said gate and closing device being pivoted to swing about different axes, and operative connections between said closing device and said gate constructed to produce an angular movement of the gate greater than the angular movement of said closing device.

5. The combination with a chamber provided with a discharge opening, a chamber arranged to receive the material discharged through said opening, and a gate for said discharge opening pivoted at one side of the opening, of a gate closing device pivoted at the opposite side of said opening and arranged to be moved by the material accumulating in the receiving chamber, and operative connections between said gate closing device and said gate.

6. The combination with a chamber provided with a discharge opening, a chamber arranged to receive the material discharged through said opening, and a gate for said discharge opening pivoted at one side of the opening, of a gate closing device pivoted at the opposite side of said opening and arranged to be moved by the material accumulating in the receiving chamber, and operative connections between said gate closing device and said gate constructed to produce a movement of the gate greater than the movement of said closing device.

7. The combination with a chamber provided with a discharge opening, a chamber arranged to receive the material discharged through said opening, and a pivoted gate for said discharge opening, of a pivoted gate closing device arranged to be moved by the material accumulating in the receiving chamber, said gate and closing device being pivoted to swing about different axes, and operative connections between said closing device and said gate, said connections being located at the outside of the apparatus and being adjustable to change the angular position of the closing device relative to the gate.

8. The combination with a chamber provided with a discharge opening, a chamber arranged to receive the material discharged through said opening, and a pivoted gate for said discharge opening, of a pivoted gate closing device arranged to be moved by the material accumulating in the receiving chamber, said gate and closing device being pivoted to swing about different axes, rock arms secured to said gate and to said closing device, and a link connecting said arms, the arm of said closing device being longer than the arm of said gate.

9. The combination with a chamber provided with a discharge opening, a chamber arranged to receive the material discharged through said opening, a gate for said discharge opening, a gate closing device arranged to be actuated by the material accumulating in the receiving chamber, and yielding operative connections between said gate closing device and said gate.

10. The combination with a chamber provided with a discharge opening, a chamber arranged to receive the material discharged through said opening, and a pivoted gate for said discharge opening, of a pivoted gate closing device arranged to be moved by the material accumulating in the receiving chamber, said gate and closing device being pivoted to swing about different axes, a latch for holding said gate closed, and operative connections between said closing device and said gate which permit a continued independent movement of the gate closing device after the gate is closed.

11. The combination with a chamber provided with a discharge opening, a chamber arranged to receive the material discharged through said opening, a gate for said discharge opening, a gate closing device arranged to be actuated by the material accumulating in the receiving chamber, and yielding operative connections between said gate closing device and said gate constructed to produce a movement of said gate greater than the actuating movement of said closing device.

12. The combination with a chamber provided with a discharge opening, a chamber arranged to receive the material discharged through said opening, means which produce a wave in the material in said receiving chamber, and a gate for said discharge opening, of a gate closing device arranged to be actuated by said wave in the material, operative connections between said device and said gate constructed to produce a movement of said gate greater than the movement of said closing device, and a latch which secures said gate when closed.

13. The combination with a chamber provided with a discharge opening, a chamber arranged to receive the material discharged through said opening, and a pivoted gate for said discharge opening, of a pivoted gate closing device arranged to be moved by the material accumulating in the receiving chamber, said gate and closing device being pivoted to swing about different axes, and operative connections between said closing device and said gate constructed to produce an angular movement of the gate greater than the angular movement of said closing device, said closing device being adaptable angularly to different relations to said operative connections.

14. The combination with a chamber provided with a discharge opening, a chamber arranged to receive the material discharged through said opening, and a pivoted gate for said discharge opening, of a pivoted gate closing device arranged to be moved by the material accumulating in the receiving chamber, said gate and closing device being pivoted to swing about different axes, rock arms secured to said gate and to said closing device, and a link connecting said arms, one of said rock arms being adjustable angularly to different positions relative to the part to which it is connected.

Witness my hand, this 24 day of March, 1914.

ALFRED W. FRENCH.

Witnesses:
CHARLES B. TIPTON,
M. M. WHITLOCK.